US008663416B2

(12) United States Patent
Dolsey et al.

(10) Patent No.: US 8,663,416 B2
(45) Date of Patent: Mar. 4, 2014

(54) HEAT TRANSFER METHODS AND SHEETS FOR APPLYING AN IMAGE TO A SUBSTRATE

(75) Inventors: Russell Dolsey, Roswell, GA (US); Frank Kronzer, Woodstock, GA (US)

(73) Assignee: Neenah Paper, Inc., Alpharetta, GA (US)

( * ) Notice: Subject to any disclaimer, the term of this patent is extended or adjusted under 35 U.S.C. 154(b) by 0 days.

(21) Appl. No.: 12/796,888

(22) Filed: Jun. 9, 2010

(65) Prior Publication Data

US 2011/0303353 A1 Dec. 15, 2011

(51) Int. Cl.

| | |
|---|---|
| ***B29C 65/02*** | (2006.01) |
| ***B32B 37/06*** | (2006.01) |
| ***B32B 37/14*** | (2006.01) |
| ***B32B 37/18*** | (2006.01) |
| ***B32B 37/26*** | (2006.01) |
| ***B32B 38/04*** | (2006.01) |
| ***B32B 38/10*** | (2006.01) |

(52) U.S. Cl.
USPC ........... 156/268; 156/250; 156/257; 156/263; 156/267; 156/289

(58) Field of Classification Search
USPC .................. 156/250, 257, 263, 267, 268, 289
See application file for complete search history.

(56) References Cited

U.S. PATENT DOCUMENTS 4,423,106 A * 12/1983 Mahn ............................ 428/207
4,496,618 A 1/1985 Pernicano
4,705,584 A * 11/1987 Lauchenauer .................. 156/79
4,863,781 A 9/1989 Kronzer
5,006,502 A 4/1991 Fujimura et al.
5,242,739 A 9/1993 Kronzer et al.
5,310,589 A 5/1994 Nagashima
5,312,645 A 5/1994 Dressler
5,372,987 A 12/1994 Fisch et al.
5,432,258 A 7/1995 Yoshimura
5,441,785 A 8/1995 Liebe, Jr.
5,471,785 A 12/1995 Matthews
5,667,614 A 9/1997 Stahl
5,798,179 A 8/1998 Kronzer
6,045,904 A * 4/2000 Torikoshi et al. ............. 428/334
6,083,610 A 7/2000 Hirose
6,165,308 A * 12/2000 Chen et al. .................... 156/289

(Continued)

FOREIGN PATENT DOCUMENTS

GB 2036643 A 7/1980

OTHER PUBLICATIONS

International Search Report; Jul. 11, 2011.

*Primary Examiner* — Sonya Mazumdar
(74) *Attorney, Agent, or Firm* — Dority & Manning, P.A.

(57) ABSTRACT

Methods of transferring an image to a substrate are generally provided. A heat transfer material can be partially cut to define a shape with cuts made into the heat transfer material (i.e., into its thickness). The heat transfer material includes a transferable portion overlying a release layer overlying a base sheet such that the cuts are made into the heat transfer material through the transferable portion while leaving the release layer and base sheet uncut. The transferable portion of the heat transfer material can be removed from the base sheet in an area surrounding the shape. Then, the heat transfer material can be positioned adjacent the substrate such that the transferable portion defined by the shape contacts the substrate. Heat and pressure can be applied to the heat transfer material. Thereafter, the base sheet can be removed.

21 Claims, 4 Drawing Sheets

(56) References Cited

U.S. PATENT DOCUMENTS

| | | | | |
|---|---|---|---|---|
| 6,210,794 | B1 | 4/2001 | Nakamura | |
| 6,224,964 | B1 | 5/2001 | Kawai et al. | |
| 6,265,053 | B1 | 7/2001 | Kronzer et al. | |
| 6,306,486 | B1 | 10/2001 | Hirano et al. | |
| 6,395,375 | B1 | 5/2002 | Imamura et al. | |
| 6,482,285 | B2 | 11/2002 | Cross | |
| 6,613,412 | B1 | 9/2003 | Dressler | |
| 6,726,982 | B2 * | 4/2004 | Christian et al. | 428/195.1 |
| 6,916,751 | B1 | 7/2005 | Kronzer | |
| 7,238,410 | B2 | 7/2007 | Kronzer | |
| 7,364,636 | B2 * | 4/2008 | Kronzer | 156/230 |
| 2003/0146944 | A1 | 8/2003 | Lehmkuhl | |
| 2004/0023019 | A1 * | 2/2004 | Vandenberg et al. | 428/323 |
| 2004/0197536 | A1 | 10/2004 | Stahl | |
| 2006/0169399 | A1 * | 8/2006 | Kronzer | 156/235 |
| 2006/0237117 | A1 * | 10/2006 | Lee | 156/73.3 |
| 2007/0221317 | A1 * | 9/2007 | Kronzer et al. | 156/230 |
| 2008/0258457 | A1 * | 10/2008 | Commander | 283/107 |
| 2009/0110850 | A1 * | 4/2009 | Kronzer | 428/32.81 |
| 2012/0325401 | A1 * | 12/2012 | Dolsey et al. | 156/247 |

* cited by examiner

HEAT TRANSFER METHODS AND SHEETS FOR APPLYING AN IMAGE TO A SUBSTRATE

BACKGROUND OF THE INVENTION

Heat transfer papers for transferring letters, figures, designs, and other shapes (referred to collectively as "shapes") to a substrate for the purpose of display and/or decoration have developed into a significant industry. When heat transfer paper is used for transferring letters, figures and designs to a substrate, there have been a variety of transfer methods. For instance, the desired shape can be printed onto the heat transfer paper, in advance, on a substrate with a thermally transferable material according to a proper printing method (e.g., silk screen printing, gravure printing, offset printing, etc.), and then the shape is transferred to the substrate. Another exemplary method includes applying a thermally transferable layer on the whole surface of the heat transfer paper, cutting out the desired shape(s) from the heat transfer paper, and then transferring the shape to a substrate using heat and pressure (e.g., applied to an ironing sheet).

Methods where the shapes are formed through printing can be suitable for preparing a large amount of heat transfer materials of the same letters or figures and designs. However, the relatively high costs and expenses involved in printing can lead to high costs per unit, especially for small scale production.

Methods where a heat transfer sheet having a thermally transferable layer applied onto the whole surface of a base which layer is cut into the desired shape can have a number of ways to apply the shapes to the substrate. In one example, the shapes can be cut fully out of the heat transfer paper (i.e., the shape is cut through the entire thickness of the heat transfer sheet), and then arranged and applied to the substrate to be transferred. However, this method can lead to inaccuracies and difficulties in exactly replicating the design when multiple shapes must be individually arranged together (e.g., multiple letters forming a word).

Alternatively, the shape can be cut into the heat transfer material only to the base sheet (i.e., leaving the base sheet intact). For example, the shape can be cut using an automatic cutting machine controlled by a computer. There have been known a variety of methods for preparing letters or patterns with such an automatic cutting machine. Then, transfer tape can be utilized to remove the shape(s) from the heat transfer material and position it (them) on the substrate. However, in this method, the areas surrounding the shape to be transferred to the substrate must be removed (i.e., weeded) from the transfer material. Then, the remaining shape on the base sheet can be lifted from the base sheet and laid onto the substrate. Thus, the tape must be able to temporarily bond to the shape, and the substrate, withstand the transfer process, and then be removable from the transferred shape and the substrate without damaging either. Such selection of tape can be difficult, and the tape can significantly increase the cost of the transfer as suitable tape can be expensive.

In another alternative method, the shape can be cut into the heat transfer material leaving the base sheet intact, and the areas surrounding the shape can be removed leaving only the shape on the base sheet. Then, the shape can be transferred to the substrate. However, removing the areas around the shape can be difficult using presently available heat transfer sheets. For example, the removal of the unnecessary portions of the transfer layer by peeling can be relatively easy when the thickness of the transfer layer which is applied onto the base sheet over a releasing layer is thick. However, such thick transfer layers can lead to overly thick shapes transferred onto the substrate and are subject to more wear over time. On the other hand, removing the unwanted portion of a thin transfer layer is difficult and can lead to deformation in the shape to be transferred.

A need exists, therefore, for an improved method of heat transfer for shapes and improved heat transfer material.

SUMMARY OF THE INVENTION

Aspects and advantages of the invention will be set forth in part in the following description, or may be obvious from the description, or may be learned through practice of the invention.

According to one particular embodiment, a method of transferring an image to a substrate is generally provided. For example, a heat transfer material can be partially cut to define a shape with cuts made into the heat transfer material (i.e., into its thickness). The heat transfer material includes a transferable portion overlying a release layer overlying a base sheet such that the cuts are made into the heat transfer material through the transferable portion while leaving the release layer and base sheet uncut. The transferable portion of the heat transfer material can be removed from the base sheet in an area surrounding the shape. Then, the heat transfer material can be positioned adjacent the substrate such that the transferable portion defined by the shape contacts the substrate. Heat and pressure can be applied to the heat transfer material. Thereafter, the base sheet can be removed.

Embodiments can also include a peel force of about 10 to about 100 grams (e.g., about 25 to about 50 grams) used to remove the transferrable portion of the heat transferrable material from the base sheet. Additional embodiments can include using a polymeric binder and powdered thermoplastic polymer in a ratio of from about 2:1 to about 20:1 in a color layer and embodiments where the color layer is cross-linked or non-cross-linked. A top layer may be used that includes a film-forming binder and a powdered thermoplastic polymer configured to melt and flow at the transfer temperature such that the top layer bonds to the substrate.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof to one skilled in the art, is set forth more particularly in the remainder of the specification, which includes reference to the accompanying figures, in which.

Figure 1:
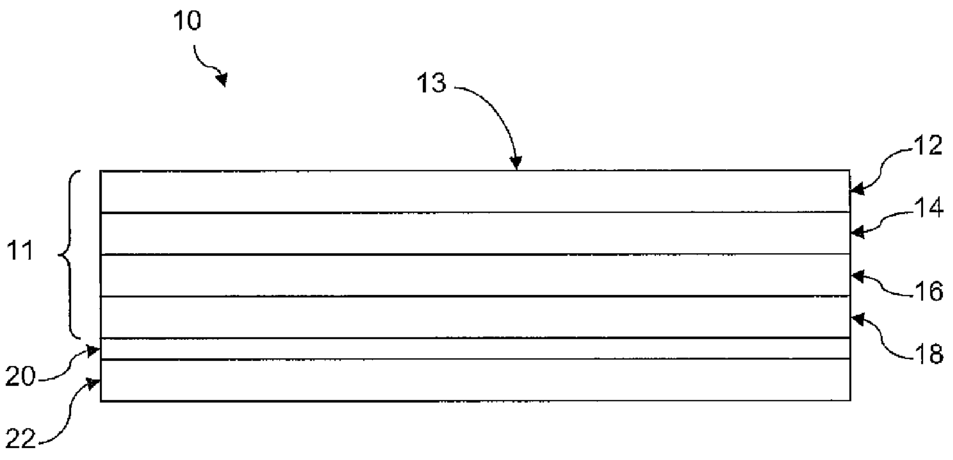
FIG. 1 shows an exemplary heat transfer sheet according to one embodiment of the present invention.

Repeat use of reference characters in the present specification and drawings is intended to represent the same or analogous features or elements of the present invention.

Definitions

The term "molecular weight" generally refers to a weight-average molecular weight unless another meaning is clear from the context or the term does not refer to a polymer. It long has been understood and accepted that the unit for molecular weight is the atomic mass unit, sometimes referred to as the "dalton." Consequently, units rarely are given in current literature. In keeping with that practice, therefore, no units are expressed herein for molecular weights.

As used herein, the term "cellulosic nonwoven web" is meant to include any web or sheet-like material which contains at least about 50 percent by weight of cellulosic fibers. In addition to cellulosic fibers, the web may contain other natural fibers, synthetic fibers, or mixtures thereof. Cellulosic nonwoven webs may be prepared by air laying or wet laying relatively short fibers to form a web or sheet. Thus, the term includes nonwoven webs prepared from a papermaking furnish. Such furnish may include only cellulose fibers or a mixture of cellulose fibers with other natural fibers and/or synthetic fibers. The furnish also may contain additives and other materials, such as fillers, e.g., clay and titanium dioxide, surfactants, antifoaming agents, and the like, as is well known in the papermaking art.

As used herein, the term "polymer" generally includes, but is not limited to, homopolymers; copolymers, such as, for example, block, graft, random and alternating copolymers; and terpolymers; and blends and modifications thereof. Furthermore, unless otherwise specifically limited, the term "polymer" shall include all possible geometrical configurations of the material. These configurations include, but are not limited to isotactic, syndiotactic, and random symmetries.

The term "thermoplastic polymer" is used herein to mean any polymer which softens and flows when heated; such a polymer may be heated and softened a number of times without suffering any basic alteration in characteristics, provided heating is below the decomposition temperature of the polymer. Examples of thermoplastic polymers include, by way of illustration only, polyolefins, polyesters, polyamides, polyurethanes, acrylic ester polymers and copolymers, polyvinyl chloride, polyvinyl acetate, etc. and copolymers thereof.

In the present disclosure, when a layer is being described as "on" or "over" another layer or substrate, it is to be understood that the layers can either be directly contacting each other or have another layer or feature between the layers. Thus, for example as shown in the figures and described in the accompanying descriptions, these terms are simply describing the relative position of the layers to each other and do not necessarily mean "on top of" since the relative position above or below depends upon the orientation of the structure to the viewer.

DETAILED DESCRIPTION

It is to be understood by one of ordinary skill in the art that the present discussion is a description of exemplary embodiments only, and is not intended as limiting the broader aspects of the present invention, which broader aspects are embodied in the exemplary construction.

Methods of forming an image on a substrate are generally provided, along with the heat transfer sheets for use in such methods. The presently disclosed methods can transfer a shape or shapes to a substrate without the use of a transfer tape and without the use of an ironing sheet, effectively reducing the cost per transfer of the shapes. The presently disclosed methods are less time consuming and less prone to errors due to the ease of weeding the shapes to be transferred to the substrate.

FIG. 1 shows an exemplary heat transfer material 10 for use according to methods of the present disclosure. The heat transfer material 10 includes a transferable portion 11. The transferable portion 11 includes a top layer 12, an optional intermediate layer 14, a color layer 16, and a tie layer 18. The transferable portion 11 overlies a non-transferable portion of a release layer 20 on a base sheet 22.

Figure 2:
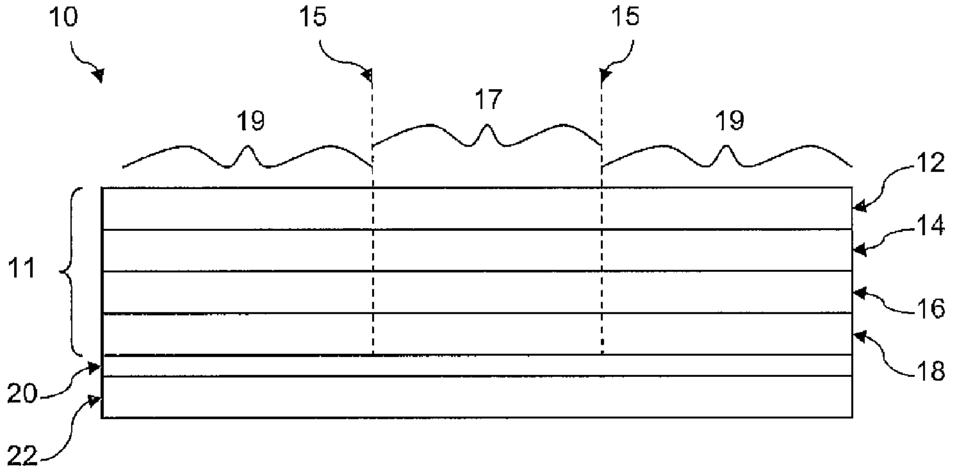
FIG. 2 shows cuts in the exemplary heat transfer sheet of FIG. 1 according to one embodiment of the present invention.

Transferring an image to a substrate can be achieved by cutting a shape partially into a heat transfer material 10 such that the shape (i.e., the image) is defined by cuts in the heat transfer material through the transferable portion while leaving the release layer and paper substrate uncut. FIG. 2 shows cuts 15 through the thickness of the heat transfer material 10 defined by the transferable portion 11 while leaving the release layer 20 and the base sheet 22 uncut. The cuts 15 can define a shape 17.

The cuts can be achieved through plotter cutting via a plotter cutter (also known as a cutting plotter). Plotter cutters are well known in the art and are readily available commercially. Suitable plotter cutters for use with the present invention can include, but are not limited to, roll-feed cutting plotters, flatbed cutting plotters, desktop cutting plotters, etc. Generally, a plotter is a graphics printer that uses a pen or pencil to draw images, and works closely with a computer's imaging software to produce a final picture or object. Plotters differ from printers in that plotters use continuous lines to create images. Like printers, plotters are connected to computers and are used to produce complex images and text. Cutting plotters are formed by replacing a plotter's pen with a knife or sharp razor blade. The cutting plotter may also contain a pressure control device that regulates how firmly the knife presses down on the material, to control the depth of the cuts formed. Though cutting plotters can be operated by moving the cutter's knife rather than the material itself (e.g., flatbed cutting plotters), many cutting plotters working with flexible material continue to use the sliding roller featured in pen plotters (e.g., roll-feed cutting plotters).

Suitable plotter cutters capable of cutting the desired graphics into a workpiece and controlling the depth of the cuts are available commercially from many manufactures, including but not limited to, Graphtec America Inc. (Santa Ana, Calif.) under series designated FC8000 and CE5000; Roland DG Corp. (Japan) under series VersaUV LEC; and Cricut® cutters (from Cricut®, Spanish Fork, Utah a division of Provo Craft and Novelty, Inc.), just to name a few.

The area of the heat transfer material 10 not defining the shape 15 can be referred to as the extra area 19 of the transferable portion 11 of the heat transfer material 10. This extra area 19 of the transferable portion 11 of the heat transfer material 10 can be removed from the heat transfer material 10 to leave a transitional heat transfer sheet 30. The transfer portion 11 remaining on the transitional heat transfer sheet 30 (i.e., shape 15) defines the mirror image of the shape to be transferred on the final substrate.

In one particular embodiment, the peel force required to remove the extra area 19 is relatively light such that the user can remove the extra area 19 by hand without the use of lifting tape or other tools. Thus, the extra area 19 can be weeded from the heat transfer material 10 relatively easily without risk of damaging the material forming shape 15 or the base sheet 22. For example, the peel force can be about 10 grams to about 100 grams, more desirably about 25 grams to about 50 grams as measured by using an Instron 5500R Tensile Tester (Instron Corp., Norwood, Mass.) set to measure the average load required to peel a 2 inch wide strip of transferable portion 11 away from the base sheet 22 and release 20, the testing being performed at a rate of 300 mm/minute.

Figure 4:
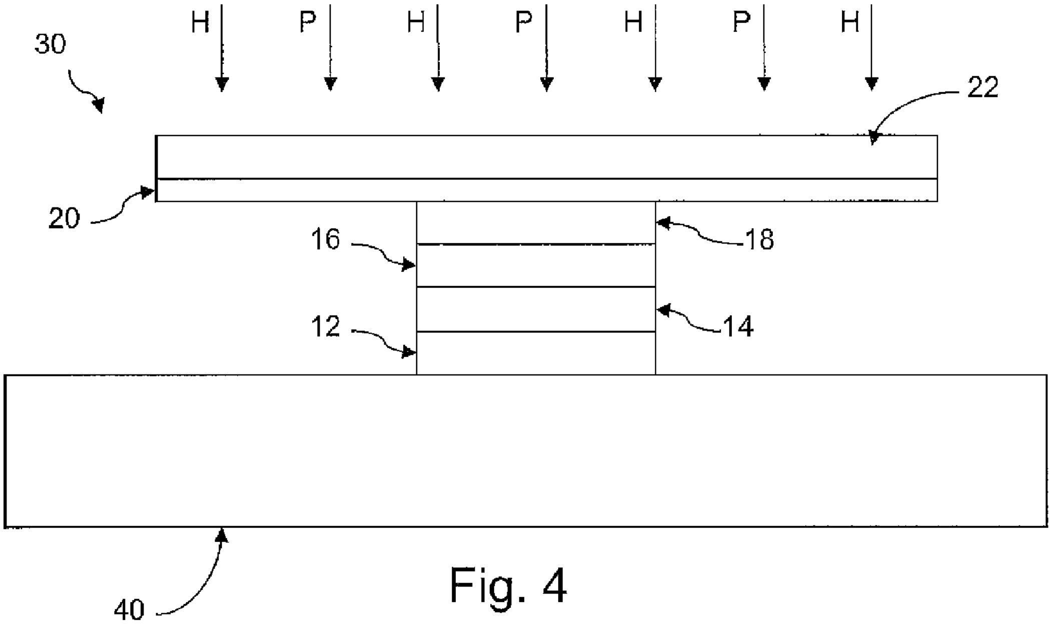
FIG. 4 shows a the exemplary heat transfer sheet of FIG. 3 transferring the image to a substrate.

The transitional heat transfer sheet 30 can be positioned adjacent to the substrate such that the surface 13 of the top layer 12 of the transferable portion 11 defined by the shape 15 contacts the substrate 40, such as shown in FIG. 4. Heat (H) and pressure (P) then can be applied to the base sheet 22 to transfer the transferable portion 11 to the substrate 40.

The heat (H) and pressure (P) can be applied to the transitional heat transfer sheet 30 via a heat press, an iron (e.g., a conventional hand iron), or any suitable heating and pressing process. The heat (H) and pressure (P) can be applied to the transitional heat transfer sheet 30 for a time sufficient to cause at least the top layer 12, the intermediate layer 14 (when present), and an non-cross-linked color layer 16 (when present) to soften and melt. Temperatures at the transfer can be from about 120° C. or greater, such as from about 120° C. to about 220° C., and can be applied for a period of a few seconds to a few minutes (e.g., from about 5 seconds to about 5 minutes).

At the transfer temperature, the meltable layers soften and flow into the substrate 40 to bond the shape 15 to the substrate 40. Once the heat (H) and pressure (P) are removed from the transitional heat transfer sheet 30, the base sheet 22 can be removed before the transitional heat transfer sheet 30 can substantially cool (i.e., while the transitional heat transfer sheet 30 is still hot) as a hot peel or after allowing the transitional heat transfer sheet 30 to cool as a cold peel.

During a hot peel (i.e., before the transitional heat transfer sheet 30 can substantially cool), the tie layer 18 can split when the base sheet 22 is removed. Thus, a first portion of the tie layer 18 remains on the base sheet 22 and is removed from the substrate 40, while a second portion of the tie layer 18 is transferred to the substrate 40 along with the rest of the transferable portion 11. As used herein, the phrase "hot peelable transfer process" refers to a process wherein one or more meltable layers is still in a molten state when a non-transferable portion (i.e., the release layer 20 and the base sheet 22) of a transitional heat transfer sheet 30 is removed from the substrate 40 after applying heat and pressure. Such a process allows release of the transitional heat transfer sheet 30 via splitting of the melted tie layer 18.

Alternatively, during a cold peel (i.e., after the transitional heat transfer sheet 30 has substantially cooled to room temperature), the tie layer 18 can release from the release layer 20 such that substantially all of the tie layer 18 is transferred to the substrate 40. This cold peel process results in the transfers shown in FIGS. 5*a*-5*c* where the tie layer 18 is completely transferred to the substrate 40 with the rest of the transfer portion 11 of the transitional heat transfer sheet 30.

I. Top Layer

The top layer 12 defines an outer surface 13 of the heat transfer material 10 and will ultimately contact the substrate 40 to which the shape is to be transferred. The top layer 12 is configured to melt and flow at the transfer temperature such that the top layer 12 can bond to the substrate 40. Additionally, the top layer can protect the underlying layers (e.g., the optional intermediate layer 14 and/or the color layer 16) prior to use of the heat transfer material 10. For example, the top layer 12 can have essentially no tack at room temperatures (e.g., about 20° C. to about 25° C.) while melting and flowing into the substrate at the transfer temperatures.

The top layer 12 of the heat transfer material 10 is configured to melt and flow into the substrate 40 during the application of heat (H) and pressure (P) in the transfer process. The top layer 12 generally softens and melts at the transfer temperature, and in particular embodiments, at temperatures lower than the transfer temperature. For example, the top layer 12 can melt at temperatures of about 65° C. to about 180° C., such as about 80° C. to about 130° C. However, since the top layer 12 is exposed as an outer surface of the heat transfer material 10, the top layer 12 also protects the underlying layers and has generally no tack at room temperature.

The basis weight of the top layer 12 generally may vary from about 2 to about 70 g/m$^2$. Desirably, the basis weight of the top layer 12 may vary from about 20 to about 50 g/m$^2$, more desirably from about 25 to about 45 g/m$^2$. The top layer 12 can generally include one or more coats or layers of a film-forming binder and a powdered thermoplastic polymer. The composition of the coats or layers may be the same or may be different. Desirably, the top layer 12 will include greater than about 10 percent by weight of the film-forming binder and less than about 90 percent by weight of the powdered thermoplastic polymer. In one particular embodiment, the top layer 12 includes from about 40% to about 75% of the film-forming binder and from about 20% to about 50% of the powdered thermoplastic polymer (based on the dry weights), such as from about 55% to about 70% of the film-forming binder and from about 25% to about 40% of the powdered thermoplastic polymer.

In general, each of the film-forming binder and the powdered thermoplastic polymer can melt in a range of from about 65° C. to about 180° C. For example, each of the film-forming binder and powdered thermoplastic polymer may melt in a range of from about 80° C. to about 130° C. Manufacturers' published data regarding the melt behavior of film-forming binders or powdered thermoplastic polymers correlate with the melting requirements described herein. It should be noted, however, that either a true melting point or a softening point may be given, depending on the nature of the material. For example, materials such as polyolefins and waxes, being composed mainly of linear polymeric molecules, generally melt over a relatively narrow temperature range since they are somewhat crystalline below the melting point. Melting points, if not provided by the manufacturer, are readily determined by known methods such as differential scanning calorimetry. Many polymers, and especially copolymers, are amorphous because of branching in the polymer chains or the side-chain constituents. These materials begin to soften and flow more gradually as the temperature is increased. It is believed that the ring and ball softening point of such materials, as determined, for example, by ASTM Test Method E-28, is useful in predicting their behavior in the present invention.

The molecular weight generally influences the melting point properties of the thermoplastic polymer, although the actual molecular weight of the thermoplastic polymer can vary with the melting point properties of the thermoplastic polymer. In one embodiment, the thermoplastic polymer can have an average molecular weight of about 1,000 to about 1,000,000. However, as one of ordinary skill in the art would recognize, other properties of the polymer can influence the melting point of the polymer, such as the degree of cross-linking, the degree of branched chains off the polymer backbone, the crystalline structure of the polymer when coated as a layer, etc.

The powdered thermoplastic polymer may be any thermoplastic polymer that meets the criteria set forth herein. For example, the powdered thermoplastic polymer may be a polyamide, polyester, ethylene-vinyl acetate copolymer, polyolefin, and so forth. In addition, the powdered thermoplastic polymer may consist of particles that are from about 2 to about 50 micrometers in diameter.

Likewise, any film-forming binder may be employed which meets the criteria specified herein. Polymeric materials suitable for use as the film-forming binder of the top layer 12 include, but are not limited to, copolymers of ethylene and acrylic acid, methacrylic acid, vinyl acetate, ethyl acetate, or butyl acrylate. Other polymers that may be employed include polyesters, polyamides, and polyurethanes. In one particular embodiment, water-dispersible ethylene-acrylic acid copolymers can be used. In another embodiment, binder can include a combination of ethylene-methacrylic acid copolymer (EMAA) and ethylene-acrylic acid copolymer (EAA).

Other additives may also be present in the top layer 12. For example, waxes, plasticizers, rheology modifiers, antioxidants, antistats, antiblocking agents, release agents, and other additives may be included as either desired or necessary. For instance, surfactants may be added to help disperse some of the ingredients, especially the powdered thermoplastic polymer. The surfactant(s) can be present in the meltable coating layer up to about 20%, such as from about 0.5% to about 5%. Exemplary surfactants can include nonionic surfactants, such as a nonionic surfactant having a hydrophilic polyethylene oxide group (on average it has 9.5 ethylene oxide units) and a hydrocarbon lipophilic or hydrophobic group (e.g., 4-(1,1,3,3-tetramethylbutyl)-phenyl), such as available commercially as Triton® X-100 (Rohm & Haas Co., Philadelphia, Pa.). In one particular embodiment, a combination of at least two surfactants is present in the meltable coating layer.

A plasticizer may be also included in the meltable coating layer 12. A plasticizer is an additive that generally increases the flexibility of the final product by lowering the glass transition temperature for the plastic (and thus making it softer). In one embodiment, the plasticizer can be present in the meltable coating layer up to about 25%, such as from about 5% to about 20%, by weight. One particularly suitable plasticizer is 1,4-cyclohexane dimethanol dibenzoate, such as the compound sold under the trade name Benzoflex 352 (Velsicol Chemical Corp., Chicago). Likewise, viscosity modifiers can be present in the meltable coating layer. Viscosity modifiers are useful to control the rheology of the coatings in their application. A particularly suitable viscosity modifier is high molecular weight poly(ethylene oxide), such as the compound sold under the trade name Alkox R400 (Meisel Chemical Works, Ltd). The viscosity modifier can be included in any amount, such as up to about 5% by weight, such as about 0.5% to about 3% by weight.

For example, in one particular embodiment, the film forming binder in top layer 12 can include an ethylene acrylic acid dispersion (such as available as Michem Prime 4983 from Michelman Inc., Cincinnati, Ohio) and powdered high density polyethylene wax (5 micron average particle size) (available as MPP 635G from Micropowders Inc., Tarrytown, N.Y.) and a high molecular weight poly(ethylene oxide) rheology modifier such as available under the name ALKOX® 8400 (Meisei Chemical Works, Inc., Japan). The top layer 12 can include the ethylene acrylic acid dispersion at about 55% to about 75% by weight (e.g., about 66% by weight), the powdered high density polyethylene wax at about 25% to about 40% (e.g., about 33% by weight), and the high molecular weight poly(ethylene oxide) at about 0.1% to about 2% by weight.

In one embodiment, the top layer 12 is an extruded film layer. For example, the top layer 12 may be applied to the heat transfer sheet 10 with an extrusion coater that extrudes molten polymer through a screw into a slot die. The film exits the slot die and flows by gravity onto the base sheet 22. The resulting coated material is passed through a nip to chill the extruded film and bond it to the underlying layers. For less viscous polymers, the molten polymer may not form a self-supporting film. In these cases, the material to be coated may be directed into contact with the slot die or by using rolls to transfer the molten polymer from a bath to the heat transfer material.

II. Intermediate Layer

Figure 5A:
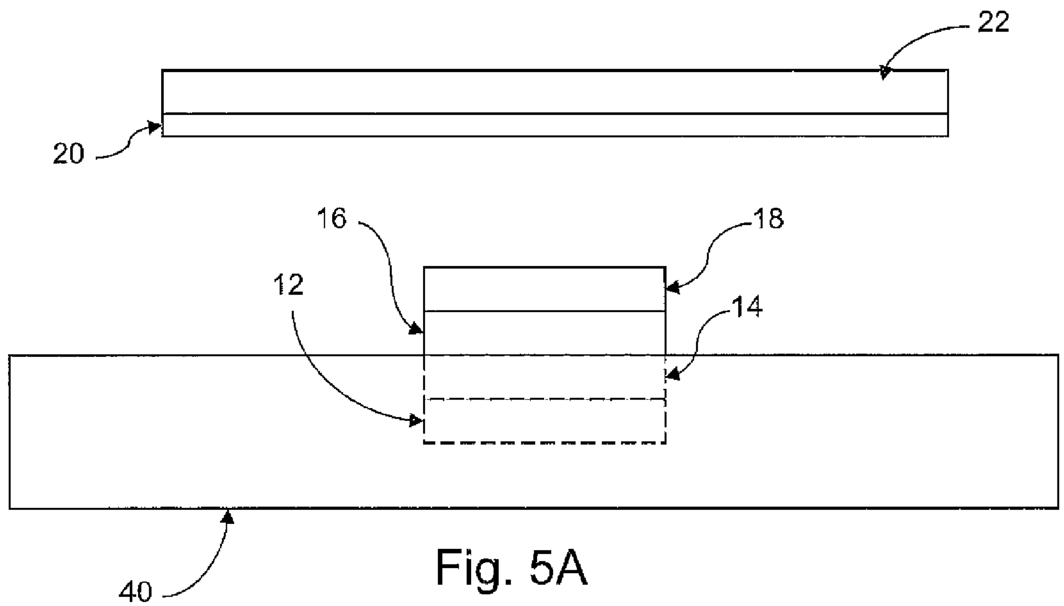
FIGS. 5A, 5B, and 5C show exemplary substrates having an imaged formed thereon.

The intermediate layer 14 is an optional layer in the heat transfer material 10, depending on the chemistry of the underlying color layer 16. The intermediate layer 14 may be included between the top layer 12 and the color layer 16, especially if the color layer 16 is cross-linked. When present, the intermediate layer 14 can help bond the color layer to the substrate. For example, FIG. 5A shows a cross-linked color layer 16 that does not appreciably melt and flow into the substrate at the transfer temperature. In this embodiment, the intermediate layer 14 is included between the top layer 12 and the color layer 16 to help bond the cross-linked color layer 16 to the substrate 40.

Figure 5B:
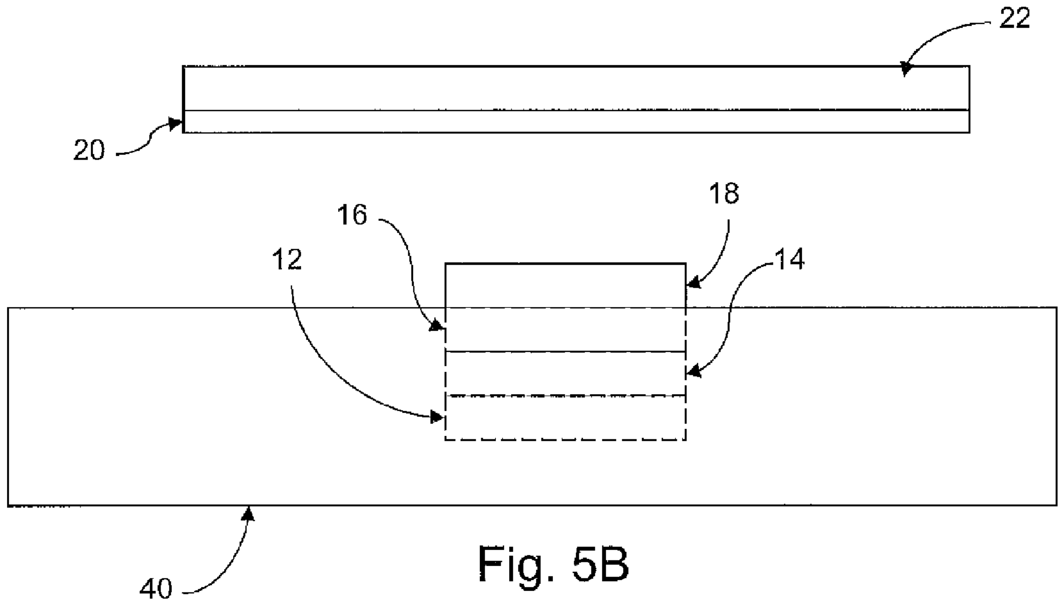
Figure 5C:
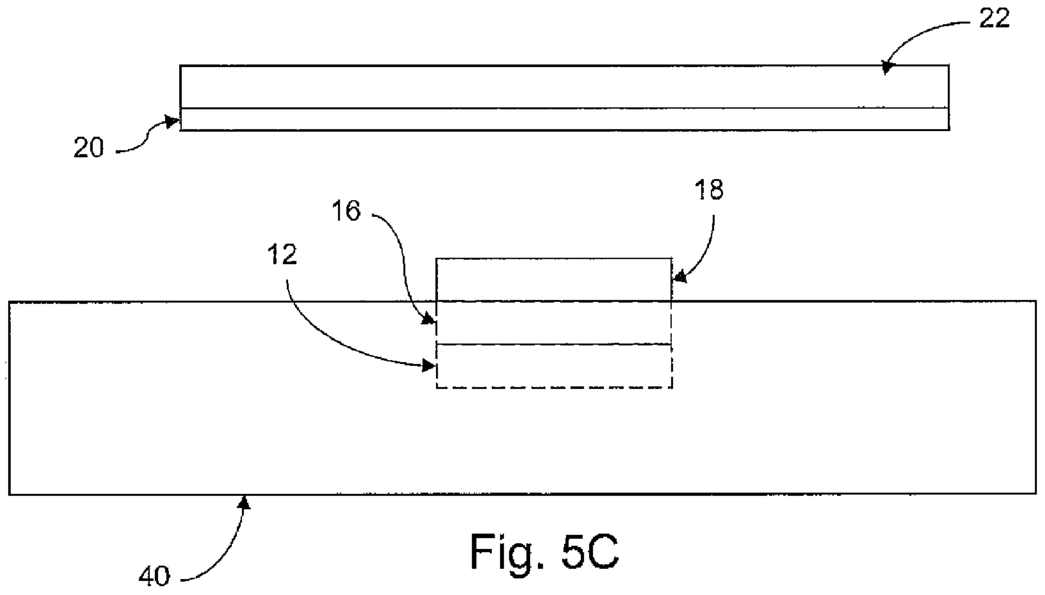

Alternatively, when the color layer 16 is a non-cross-linked layer, the presence of the intermediate layer 14 can further improve bonding between the non-cross-linked color layer 16 and the substrate 40, as shown in FIG. 5B. In this embodiment, both the intermediate layer 14 and the color layer 16 melt and flow into the substrate 40 at the transfer temperature. However, when the color layer 16 is a non-cross-linked layer (FIG. 5C), the intermediate layer 14 may be omitted from the construction of the heat transfer material 10 since the non-cross-linked color layer 16 can melt and flow into the substrate 40 to bond to the substrate 40.

The intermediate layer 14 can generally include a film-forming material that melts and flows at the transfer temperature. Suitable film-forming materials can be selected from polyacryls, polymethacryls, polyurethane-polyacryl mixtures, polyurethane-polymethacryl mixtures, urethane-acryl copolymers, and mixtures thereof. In one particular embodiment, the film-forming material can include polyurethanes, such as aromatic polyether polyurethanes, aliphatic polyether polyurethanes, aromatic polyester polyurethanes, aliphatic polyester polyurethanes, aromatic polycaprolactam polyurethanes, and aliphatic polycaprolactam polyurethanes. Preferred polyurethanes can be selected from aromatic polyether polyurethanes, aliphatic polyether polyurethanes, aromatic polyester polyurethanes, and aliphatic polyester polyurethanes. Examples of preferred polyurethanes can include Sancure 2710® and/or Avelure UR 445® (which are equivalent copolymers of polypropylene glycol, isophorone diisocyanate, and 2,2-dimethylolpropionic acid, having the International Nomenclature Cosmetic Ingredient name "PPG-17/PPG-34/IPDI/DMPA Copolymer") both of which are commercially available from Lubrizol, Cleveland, Ohio. In one particular embodiment, the film-forming material can be an aliphatic polyether polyurethane available under the name Sancure 2710® (Lubrizol, Cleveland, Ohio).

In general, the film-forming material can be substantially non-cross-linked to allow the intermediate layer 14 to soften and melt at the transfer temperature.

The tackiness of the film-forming material can be controlled by selective addition of powdered thermoplastic polymer, such as discussed above with reference to the top layer 12. The amount of powdered thermoplastic polymer included in the intermediate layer 14 can help decrease the tackiness of the film-forming adhesive material. In certain embodiments, the intermediate layer 14 can include the powdered thermoplastic polymer in about 5% to about 25% by weight of the intermediate layer 14, such as about 10% to about 20% by weight, based on the dry weight of the layer. Likewise, the film-forming material can be present in the intermediate layer 14 in about 75% to about 95% by weight, such as about 80% to about 90% by weight.

Other materials may also be included in the intermediate layer 14, such as surfactants, pH modifiers, etc.

III. Color Layer

The color layer 16 can generally include a polymeric binder, a powdered thermoplastic polymer, and a coloring agent. The polymeric binder can be cross-linked or non-cross-linked, depending on the particular configuration desired in the color layer 16. The polymeric binder material and the powdered thermoplastic polymer can be selected from those described above with reference to the top layer, independent of the composition of the top layer 12. In particular embodiments, polymeric particles can be included in the color layer to reduce the tack of the binder (e.g., the acrylic) in the color layer 16. For example, powdered high density polyethylene wax (5 micron average particle size) (available as MPP 635G from Micropowders Inc. of Tarrytown, N.Y.) can be included in the color layer 16.

The polymeric binder and the powdered thermoplastic polymer can be present in the color layer 16 in a ratio of about 2:1 to about 20:1 by weight percent based on the dry weight of the color layer 16, respectively, such as from about 5:1 to about 15:1 by weight percent. In other words, the weight percent of the polymeric binder in the color layer 16 can be about 2 times to about 20 times of the weight percent of the powdered thermoplastic polymer in the color layer 16 based on the dry weight of the color layer 16, such as about 5 times to about 15 times more. For example, the color layer 16 can include the polymeric binder in an amount of about 40% by weight to about 75% by weight, such as about 50% by weight to about 65% by weight, and the powdered thermoplastic polymer in an amount of about 2% to about 20% by weight, such as about 3% to about 10% by weight.

When cross-linked, the color layer 16 can further include an acrylic latex material, such as the acrylic latex available as Rhoplex B 20 from Rohm & Haas of Philadelphia, Pa. and an aziridine cross-linking agent such as available as XAMA 7 from Sybron Chemicals, Inc. of Birmingham, N.J. The aziridine cross-linking agent can be present in the color layer 16 in an amount of about 0.5% to about 5% by weight, such as about 1% to about 3% by weight.

In addition, the cross-linked color layer 16 can include a water dispersible epoxy resin (such as available as CR-5L from Esprix) and an epoxy curing agent such as 2-methyl imidazole available under the name Imicure AMI-2 (SS-83). The epoxy resin can be present in the color layer 16 in an amount of about 0.5% to about 5% by weight, such as about 1% to about 3% by weight, and the epoxy curing agent can be present in the color layer 16 in an amount of about 0.01% to about 2% by weight, such as about 0.05% to about 1% by weight The coloring agent in the color layer 16 can include any suitable colorant. In one particular embodiment, inorganic pigments free from organic material can be included in the color layer 16. For example, suitable colorants can include but are not limited to: a water based pigment concentrate based on an aluminium pigment such as available under the name Shinedecor 2000 (Eckert, Germany), $TiO_2$ (e.g., dispersed in water), phthalocyanine blue such as available under the name Monolite Blue BXE-HD paste (Heucotech, Ltd.), aquis calcium red 2B (Heucotech, Ltd) is a C.I. Pigment 48:2, Disazo Scarlet Red 166 is a diazo pigment, carbon black dispersions such as available under the name Aqua Blak 115 (Solution Dispersions), etc.

Other materials can also be included in the color layer 16, such as surfactants (e.g., a nonionic surfactant such as Triton X100 from The Dow Chemical Company), a pH modifier (e.g., ammonia), etc.

IV. Tie Layer

The tie layer 18 can adhere the color layer 16 to the release layer 20 to form the heat transfer material 10 and can provide a protective covering overlying the transferred color layer 16 on the substrate 40. As stated, the tie layer 18 can also act as a splittable layer for hot peel applications.

The tie layer 18 can be similar to the top layer 12 in that it can include a film-forming binder and a powdered thermoplastic polymer. The materials for use in the tie layer 18 can be selected from any of the materials discussed above in relation to the top layer 12. In one particular embodiment, the tie layer 18 can have an identical configuration with the top layer 12. Alternatively, the tie layer 18 can be constructed from the ingredients described above with reference to the top layer 12, independent of the configuration of the top layer 12.

V. Non-Transferable Portion (i.e., the Release Layer and the Base Sheet)

The heat transfer material 10 of the present invention includes base sheet 22 that acts as a backing or support layer for the heat transfer sheet 10. The base sheet 22 is flexible and has first and second surfaces, and is typically a film or a cellulosic nonwoven web. In addition to flexibility, the base sheet 22 also provides strength for handling, coating, sheeting, other operations associated with the manufacture thereof, and for removal after transfer of the transferable portion 11 to a substrate 40. The basis weight of the base sheet 22 generally may vary, such as from about 30 to about 150 g/m$^2$. Suitable base sheets 22 include, but are not limited to, cellulosic nonwoven webs and polymeric films. A number of suitable base sheets 22 are disclosed in U.S. Pat. Nos. 5,242,739; 5,501,902; and 5,798,179; the entirety of which are incorporated herein by reference.

Desirably, the base sheet 22 comprises paper. A number of different types of paper are suitable for the present invention including, but not limited to, common litho label paper, bond paper, and latex saturated papers. In some embodiments, the base sheet 22 can be a latex-impregnated paper such as described, for example, in U.S. Pat. No. 5,798,179. The base sheet 22 is readily prepared by methods that are well known to those having ordinary skill in the art.

The release layer 20 separates the transferable portion 11 of the heat transfer material 10 from the non-transferable material (i.e., the base sheet 22). The release layer 20 does not transfer to a coated substrate during the heat transfer process. Consequently, the release layer 20 may comprise any material having release characteristics, and may be conformable when heated. Desirably, the release layer 20 does not melt or become tacky when heated, and provides release of an image bearing coating during a hot or cold peelable transfer process.

A number of release layers 20 are known to those of ordinary skill in the art, any of which may be used in the present invention. Typically, the release layer 20 comprises a cross-linked polymer having essentially no tack at transfer temperatures (e.g. above about 175° C.). As used herein, the phrase “having essentially no tack at transfer temperatures” means that the release layer 20 does not stick to an overlaying layer to an extent sufficient to adversely affect the quality of the transferred material. Suitable polymers include, but are not limited to, silicone-containing polymers, acrylic polymers and poly(vinyl acetate). Further, other materials having a low surface energy, such as polysiloxanes and fluorocarbon polymers, may be used in the release coating layer, particularly in cold peel applications. Desirably, the release layer 20 comprises a cross-linked silicone-containing polymer or a cross-linked acrylic polymer. Suitable silicone-containing polymers include, but are not limited to, SYL-OFF® 7362, a silicone-containing polymer available from Dow Corning Corporation (Midland, Mich.). Suitable acrylic polymers include, but are not limited to, HYCAR® 26672, an acrylic latex available from Lubrizol, Cleveland, Ohio; MICHEM® Prime 4983, an ethylene-acrylic acid copolymer dispersion available from Michelman Chemical Company, Cincinnati, Ohio; HYCAR® 26684, an acrylic latex also available from Lubrizol, Cleveland, Ohio; TPX, a polymethylpentene available from Mitsui Chemicals America, Inc., Rye Brook, N.Y.; and RHOPLEX® SP 100, an acrylic latex available from Rohm & Haas, Philadelphia, Pa.

The release layer 20 may further contain additives including, but not limited to, a cross-linking agent, a release-modifying additive, a curing agent, a surfactant and a viscosity-modifying agent. Suitable cross-linking agents include, but are not limited to, XAMA 7, an aziridine cross-linker available from Lubrizol. Suitable release-modifying additives include, but are not limited to, SYL-OFF® 7210, a release modifier available from Dow Corning Corporation. Suitable curing agents include, but are not limited to, SYL-OFF® 7367, a curing agent available from Dow Corning Corporation. Suitable surfactants include, but are not limited to, TERGITOL® 15-S40, available from Union Carbide; TRITON® X100, available from Union Carbide; and Silicone Surfactant 190, available from Dow Corning Corporation. In addition to acting as a surfactant, Silicone Surfactant 190 also functions as a release modifier, providing improved release characteristics, particularly in cold peel applications.

The release layer 20 may have a layer thickness, which varies considerably depending upon a number of factors including, but not limited to, the substrate to be coated, the thickness of the tie layer 18, the press temperature, and the press time. Desirably, the release layer 20 has a thickness, which does not restrict the flow of the meltable layers of the transferable portion 11, particularly the tie layer 18. Typically, the release layer 20 has a thickness of less than about 1 mil (26 microns). More desirably, the release layer 20 has a thickness of about 0.05 mil. to about 0.5 mil. Even more desirably, the release layer 20 has a thickness of from about 0.08 mil. to about 0.33 mil.

The thickness of the release layer 20 may also be described in term of a coating weight. Desirably, the release layer 20 has a dry coating weight of less than about 6 lb./144 $yd^2$ (22.5 gsm). More desirably, the release layer 20 has a dry coating weight of from about 3.0 lb./144 $yd^2$ (11.3 gsm) to about 0.3 lb./144 $yd^2$ (1.1 gsm). Even more desirably, the release layer 20 has a dry coating weight of from about 2.0 lb./144 $yd^2$ (7.5 gsm) to about 0.5 lb./144 $yd^2$ (1.9 gsm).

In some cases, for example when the heat transfer material 10 is in roll form, it may be desirable to have a second release layer on the side opposite top layer 12 to facilitate sheet separation and/or unwind. Such a second release layer may be the same or similar to release layer 20 or may be selected from other known release layers having anti-stick or anti-blocking properties as will be apparent to those skilled in the art.

As stated, the base sheet 22 acts as a backing layer for the heat transfer material 10. The base sheet 22 is generally flexible and has first and second surfaces. The base sheet 22 can typically be a film or a cellulosic nonwoven web. In addition to flexibility, the base sheet 22 also can have sufficient strength for handling, coating, sheeting, other operations associated with the manufacture of the heat transfer material 10, and for transfer of the image to a substrate 40. The basis weight of the base sheet 22 generally may vary from about 30 to about 150 g/$m^2$. By way of example, the base sheet 22 may be a paper such as is commonly used in the manufacture of heat transfer papers. In some embodiments, the base sheet 22 can be a latex-impregnated paper such as described, for example, in U.S. Pat. No. 5,798,179, the entirety of which is incorporated herein by reference. The base sheet 22 is readily prepared by methods that are well known to those having ordinary skill in the art.

VI. Substrate

The substrate 40 can generally be a porous material that allows the melted layers to flow into the porous surface of the substrate 40 and bond to the substrate 40. For example, the substrate can be fibrous material (e.g., a woven fabric cloth, a nonwoven web, or any other fibrous material). In particular embodiments, the substrates can include, for example, garment fabrics such as 100% cotton T-shirt material, and so forth.

In one particular embodiment, the substrate can be a fabric configured for use as outdoor signage, such as on awning fabrics, umbrellas, etc. Such fabrics can typically be woven from nylon fibers.

EXAMPLES

Multiple examples of heat transfer materials were constructed with varying layers and thicknesses, such as shown in the embodiment of FIG. 1. A base paper (24 lb. super smooth base paper available under the trade name Classic Crest® from Neenah Paper, Inc., Alpharetta, Ga.) was used for each heat transfer material of these examples. It is noted that 24 lbs/ream designates the basis weight of the paper per ream (500 sheets) as commonly used to describe the paper sheet. A release coating was added at a basis weight of 2.5 lb. per ream, and included 100 dry parts Rhoplex SP 100 (Acrylic latex from Rohm and Haas) 5 dry parts of XAMA 7 (crosslinker from Bayer), 2 dry parts of Dow Corning Surfactant 190 and 5 dry parts of Carbowax polyethylene glycol 8000 (from Dow chemical Co.).

Tables 1 and 2 show the basis weight for each layer added to the release coated base paper, along with that sample's respective notes on performance.

In each example, the tie layer included 66.2% by weight of an acrylic binder (Michem Prime 4983 from Michelman Inc., Cincinnati, Ohio), 33.1% by weight of a powdered high density polyethylene wax with a 5 micron average particle size (MPP 635G from Micropowders Inc., Tarrytown, N.Y.), and 0.7% by weight of a high molecular weight poly(ethylene oxide) (ALKOX® 8400 from Meisel Chemical Works, Inc., Japan), all based on the dry weight of the layer. The top layer was chemically identical to the tie layer.

The intermediate layer included 82.6% by weight of a polyurethane film-forming adhesive material (Sancure 2710® from Lubrizol, Cleveland, Ohio), 16.5% by weight of a powdered high density polyethylene wax with a 5 micron average particle size (MPP 635G from Micropowders Inc., Tarrytown, N.Y.), and 0.8% by weight of a nonionic surfactant (Triton X100 from The Dow Chemical Company), all based on the dry weight of the layer.

Several different color layers were prepared to coat onto the heat transfer material according to the basis weights disclosed in Tables 1 and 2. The difference between the cross-linked color layers (Table 1) and the non-cross-linked color layers (Table 2) is the presence of the cross-linking materials: the water dispersible epoxy resin (CR-5L from Esprix), the epoxy curing agent (2-methyl imidazole available under the name Imicure AMI-2 (SS-83), and the aziridine cross-linking agent (XAMA 7 from Sybron Chemicals, Inc., Birmingham, N.J.), even with the same coded color layer. For example, if the code is referenced in the non-cross-linked color layers of Table 2, each of the epoxy resin, the epoxy curing agent, and the aziridine cross-linking agent were omitted from the color layer. In the preparation of each of the color layers referenced below, the pH was checked, prior to the addition of the cross-linking materials (if present), and adjusted to be 9.5 through the addition of ammonia.

Color layers are coded alphabetically A through K, and are listed below. All weight percents of the components are referenced based on the dry weight of the color layer after formation:

Color layer designated code A included 1.2% by weight of a nonionic surfactant (Triton X100 from The Dow Chemical Company), 29% by weight of $TiO_2$ (included in the layer using a dispersion in water at 55% dry solids by weight (45% water), 5.8% by weight of a powdered high density polyethylene wax having 5 micron average particle size (MPP 635G from Micropowders Inc., NY), 58.1% by weight of an acrylic latex available (Rhoplex B 20 from Rohm & Haas of Philadelphia), 1.2% by weight of ammonia, and the cross-linking material (when present) of 2.3% by weight of a water dispersible epoxy resin (CR-5L from Esprix), 0.1% by weight of 2-methyl imidazole (Imicure AMI-2 (SS-83)), and 2.3% by weight of an aziridine cross-linking agent (XAMA 7 from Sybron Chemicals, Inc., NJ).

Color layer designated code B included 1.2% by weight of a nonionic surfactant (Triton X100 from The Dow Chemical Company), 26.1% by weight of $TiO_2$ (included in the layer using a dispersion in water at 55% dry solids by weight (45% water), 2.9% by weight of a phthalocyanine blue (Monolite Blue BXE-HD paste Heucotech, Ltd.), 5.8% by weight of a powdered high density polyethylene wax having 5 micron average particle size (MPP 635G from Micropowders Inc., NY), 58.1% by weight of an acrylic latex available (Rhoplex B 20 from Rohm & Haas of Philadelphia), 1.2% by weight of ammonia, and the cross-linking material (when present) of 2.3% by weight of a water dispersible epoxy resin (CR-5L from Esprix), 0.1% by weight of 2-methyl imidazole (Imicure AMI-2 (SS-83)), and 2.3% by weight of an aziridine cross-linking agent (XAMA 7 from Sybron Chemicals, Inc., NJ).

Color layer designated code C included 1.2% by weight of a nonionic surfactant (Triton X100 from The Dow Chemical Company), 29% by weight of a phthalocyanine blue (Monolite Blue BXE-HD paste Heucotech, Ltd.), 5.8% by weight of a powdered high density polyethylene wax having 5 micron average particle size (MPP 635G from Micropowders Inc., NY), 58.1% by weight of an acrylic latex available (Rhoplex B 20 from Rohm & Haas of Philadelphia), 1.2% by weight of ammonia, and the cross-linking material (when present) of 2.3% by weight of a water dispersible epoxy resin (CR-5L from Esprix), 0.1% by weight of 2-methyl imidazole (Imicure AMI-2 (SS-83)), and 2.3% by weight of an aziridine cross-linking agent (XAMA 7 from Sybron Chemicals, Inc., NJ).

Color layer designated code D included 1.2% by weight of a nonionic surfactant (Triton X100 from The Dow Chemical Company), 26.1% by weight of $TiO_2$ (included in the layer using a dispersion in water at 55% dry solids by weight (45% water), 2.9% by weight of aquis calcium red 2B (Heucotech, Ltd), 5.8% by weight of a powdered high density polyethylene wax having 5 micron average particle size (MPP 635G from Micropowders Inc., NY), 58.1% by weight of an acrylic latex available (Rhoplex B 20 from Rohm & Haas of Philadelphia), 1.2% by weight of ammonia, and the cross-linking material (when present) of 2.3% by weight of a water dispersible epoxy resin (CR-5L from Esprix), 0.1% by weight of 2-methyl imidazole (Imicure AMI-2 (SS-83)), and 2.3% by weight of an aziridine cross-linking agent (XAMA 7 from Sybron Chemicals, Inc., NJ).

Color layer designated code E included 1.2% by weight of a nonionic surfactant (Triton X100 from The Dow Chemical Company), 29% by weight of aquis calcium red 2B (Heucotech, Ltd), 5.8% by weight of a powdered high density polyethylene wax having 5 micron average particle size (MPP 635G from Micropowders Inc., NY), 58.1% by weight of an acrylic latex available (Rhoplex B 20 from Rohm & Haas of Philadelphia), 1.2% by weight of ammonia, and the cross-linking material (when present) of 2.3% by weight of a water dispersible epoxy resin (CR-5L from Esprix), 0.1% by weight of 2-methyl imidazole (Imicure AMI-2 (SS-83)), and 2.3% by weight of an aziridine cross-linking agent (XAMA 7 from Sybron Chemicals, Inc., NJ).

Color layer designated code F included 1.2% by weight of a nonionic surfactant (Triton X100 from The Dow Chemical Company), 26.1% by weight of $TiO_2$ (included in the layer using a dispersion in water at 55% dry solids by weight (45% water), 2.9% by weight of carbon black (from Aqua Black 115, Solution Dispersions), 5.8% by weight of a powdered high density polyethylene wax having 5 micron average particle size (MPP 635G from Micropowders Inc., NY), 58.1% by weight of an acrylic latex available (Rhoplex B 20 from Rohm & Haas of Philadelphia), 1.2% by weight of ammonia, and the cross-linking material (when present) of 2.3% by weight of a water dispersible epoxy resin (CR-5L from Esprix), 0.1% by weight of 2-methyl imidazole (Imicure AMI-2 (SS-83)), and 2.3% by weight of an aziridine cross-linking agent (XAMA 7 from Sybron Chemicals, Inc., NJ).

Color layer designated code G included 1.2% by weight of a nonionic surfactant (Triton X100 from The Dow Chemical Company), 29% by weight of carbon black (from Aqua Black 115, Solution Dispersions), 5.8% by weight of a powdered high density polyethylene wax having 5 micron average particle size (MPP 635G from Micropowders Inc., NY), 58.1% by weight of an acrylic latex available (Rhoplex B 20 from Rohm & Haas of Philadelphia), 1.2% by weight of ammonia, and the cross-linking material (when present) of 2.3% by weight of a water dispersible epoxy resin (CR-5L from Esprix), 0.1% by weight of 2-methyl imidazole (lmicure AMI-2 (SS-83)), and 2.3% by weight of an aziridine cross-linking agent (XAMA 7 from Sybron Chemicals, Inc., NJ).

Color layer designated code H included 1.2% by weight of a nonionic surfactant (Triton X100 from The Dow Chemical Company), 29% by weight of a water based pigment concentrate based on an aluminium pigment (Shinedecor 2000, Eckart, Germany), 5.8% by weight of a powdered high density polyethylene wax having 5 micron average particle size (MPP 635G from Micropowders Inc., NY), 58.1% by weight of an acrylic latex available (Rhoplex B 20 from Rohm & Haas of Philadelphia), 1.2% by weight of ammonia, and the cross-linking material (when present) of 2.3% by weight of a water dispersible epoxy resin (CR-5L from Esprix), 0.1% by weight of 2-methyl imidazole (Imicure AMI-2 (SS-83)), and 2.3% by weight of an aziridine cross-linking agent (XAMA 7 from Sybron Chemicals, Inc., NJ).

Color layer designated code I included 1.2% by weight of a nonionic surfactant (Triton X100 from The Dow Chemical Company), 30.5% by weight of $TiO_2$ (included in the layer using a dispersion in water at 55% dry solids by weight (45% water), 61.0% by weight of an ethylene acrylic acid copolymer dispersion (Michem 4983R from Michelman), 6.1% by weight of a powdered high density polyethylene wax having 5 micron average particle size (MPP 635G from Micropowders Inc., NY), and 1.2% by weight of ammonia.

Color layer designated code J included 1.4% by weight of a nonionic surfactant (Triton X100 from The Dow Chemical Company), 22.5% by weight of $TiO_2$ (included in the layer using a dispersion in water at 55% dry solids by weight (45% water), 5.6% by weight of blue paste Monolite Blue BXE-DH (Heucotech, Ltd), and 70.4% by weight of a polyurethane binder (Permax 202).

Color layer designated code K included 1.4% by weight of a nonionic surfactant (Triton X100 from The Dow Chemical Company), 28.2% by weight of $TiO_2$ (included in the layer using a dispersion in water at 55% dry solids by weight (45% water), and 70.4% by weight of polyurethane binder (Permax 202).

As is apparent, the above percents will be adjusted slightly if the cross-linking material is not present.

Figure 3:
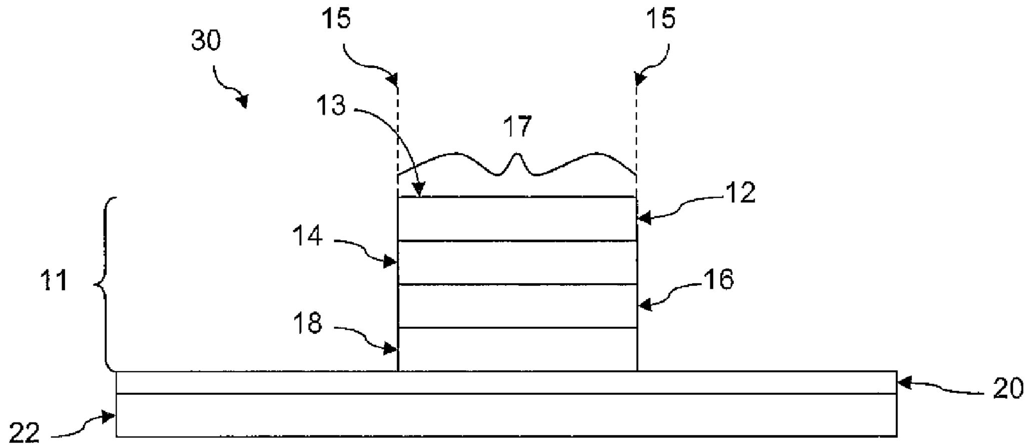
FIG. 3 shows the exemplary heat transfer sheet of FIG. 2 after removing the excess transferable areas (i.e., the extra area)

After formation of each heat transfer material, a plotter cutter (commercially available under the name Cricut® Expression Model CREX001 from Provo Craft) was used to cut a predetermined shape through the top layer, the intermediate layer (if present), the color layer, and the tie layer as shown in FIG. 2. These transferable layers were easily removed from the area surrounding the shape with little peel force required (i.e., by hand) as shown in FIG. 3. Then, the remaining transferable layers defining the shape cut were transferred to a 100% cotton T-shirt material as shown in FIG. 4, at a transfer temperature of 375° F. for 25-30 seconds. The heat transfer material was allowed to cool, and then the base sheet was peeled away.

Table 1 shows the images formed using cross-linked color layers.

TABLE 1

| | Sample No. | Color | Color Layer (code) | Tie Layer (lbs/ream) | Cross-linked Color Layer (lbs/ream) | Intermediate layer (lbs/ream) | Top Layer (lbs/ream) |
|---|---|---|---|---|---|---|---|
| Design 1 | 1 | White | A | 3.4 | 7.3 | 8.3 | 3.4 |
| | 2 | Blue | B | 3.4 | 7.3 | 8.3 | 3.4 |
| | 3 | Deep Blue | C | 3.4 | 7.3 | 8.3 | 3.4 |
| | 4 | Red | D | 3.4 | 7.3 | 8.3 | 3.4 |
| | 5 | Deep Red | E | 3.4 | 7.3 | 8.3 | 3.4 |
| | 6 | Black | F | 3.4 | 7.3 | 8.3 | 3.4 |
| | 7 | Deep Black | G | 3.4 | 7.3 | 8.3 | 3.4 |
| Design 2 | 8 | White | A | 3.4 | 4.3 | 8.3 | 3.4 |
| | 9 | Blue | B | 3.4 | 4.3 | 8.3 | 3.4 |
| | 10 | Deep Blue | C | 3.4 | 4.3 | 8.3 | 3.4 |
| | 11 | Red | D | 3.4 | 4.3 | 8.3 | 3.4 |
| | 12 | Deep Red | E | 3.4 | 4.3 | 8.3 | 3.4 |
| | 13 | Black | F | 3.4 | 4.3 | 8.3 | 3.4 |
| | 14 | Deep Black | G | 3.4 | 4.3 | 8.3 | 3.4 |
| | 15 | Silver | H | 3.3 | 4.3 | 8.3 | 3.4 |

Table 2 shows the images formed using non-cross-linked color layers.

TABLE 2

| | Sample No. | Color | Color Layer (code) | Tie Layer (lbs/ream) | Non-crass-linked Color Layer (lbs/ream) | Intermediate layer (lbs/ream) | Top Layer (lbs/ream) |
|---|---|---|---|---|---|---|---|
| Design 3 | 16 | White | I | 3.4 | 4.3 | 8.3 | 3.4 |
| | 17 | White | I | 0 | 8.1 | 8.3 | 3.4 |
| | 18 | Deep Blue | C | 3.4 | 4.3 | 8.3 | 3.4 |
| | 19 | Deep Red | E | 3.4 | 4.3 | 8.3 | 3.4 |
| | 20 | Deep Black | G | 3.4 | 4.3 | 8.3 | 3.4 |
| | 21 | Silver | H | 3.3 | 4.3 | 8.3 | 3.4 |
| Design 4 | 22 | Silver | H | 3.3 | 4.3 | 0 | 3.4 |
| | 23 | Deep Blue | C | 3.4 | 4.3 | 0 | 3.4 |
| | 24 | Deep Red | E | 3.4 | 4.3 | 0 | 3.4 |
| | 25 | Deep Black | G | 3.4 | 4.3 | 0 | 3.4 |

TABLE 3

| | Sample No. | Color | Color Layer (code) | Tie Layer (lbs/ream) | Cross-linked Color Layer (lbs/ream) | Colored Intermediate Layer (lbs/ream) | Top Layer (lbs/ream) |
|---|---|---|---|---|---|---|---|
| Design 5 | 26 | White | A, K | 3.4 | 4.3 | 4.4 | 3.4 |
| | 27 | White | A, K | 3.4 | 4.3 | 4.3 | 6.8 |
| | 28 | Blue | B, J | 3.4 | 4.3 | 4.3 | 3.4 |
| | 29 | Blue | B, J | 3.4 | 4.3 | 4.3 | 6.8 |

Table 3 shows the images formed using cross-linked and non-cross linked color layers 16 and colored intermediate layers 14.

Table 4 shows the images formed using no color layer 16 and using non-cross linked colored intermediate layers 14.

TABLE 4

| | Sample No. | Color | Color Layer (code) | Tie Layer (lbs/ream) | Cross-linked Color Layer (lbs/ream) | Non-Cross-linked colored intermediate layer (lbs/ream) | Top Layer (lbs/ream) |
|---|---|---|---|---|---|---|---|
| Design 6 | 30 | White | K | 3.4 | 0 | 8.8 | 3.4 |
| | 31 | White | K | 3.4 | 0 | 8.8 | 6.8 |
| | 32 | Blue | J | 3.4 | 0 | 8.8 | 3.4 |
| | 33 | Blue | J | 3.4 | 0 | 8.8 | 6.8 |

Design 1 uses a relatively thick cross-linked color layer and provides better color opacity when applied to very dark substrates. This thicker color layer along with a relatively heavy intermediate layer provides improved cover of substrates with heavy weaves. Design 1 may be peeled hot or cold. Dark substrates with tight weaves would be better suited for Design 2.

Design 2 is similar in construction to Design 1 except that the thickness of the cross-linked color layer of Design 2 is reduced. Design 2 is better suited for application to light or dark tighter weaved materials which tend to be lighter in weight and more flexible in hand. A thinner cross-linked color layer yields a more flexible and stretchable transfer than Design 1. Design 2 may be peeled hot or cold.

Design 3 is similar in construction to Design 2 but with a non-cross-linked color layer. Both employ a heavy intermediate layer mainly for the benefit of improving the hold out of the color layer and its opacity. Design 3 would function well on heavy weave materials. Since the color layer is not cross-linked it would not necessarily have the strength to withstand the forces exerted by hot peeling and it is best suited for peeling cold. Design 3 shows the greatest color vibrancy on white fabric and tends to have good flexibility.

Design 4 is similar to Design 3 in that the color layer is not cross-linked. However, Design 4 has no intermediate layer. It may or may not have an outer layer. Design 4 may or may not have a tie layer, depending upon the selection of the binder in color layer and the selection of the release layer. Design 4 relies upon the fact that the color layer is not cross-linked and the colored layer binds to the substrate it is being transferred to. Since the color layer is not cross-linked it may lack the strength to withstand the forces exerted by hot peeling and it is best suited for peeling cold. This design demonstrates best suitability for tight weave materials and shows the greatest color vibrancy on white fabric. Design 4 also exhibits the softest hand.

Design 5 has a relatively thin cross-linked color layer in combination with a colored intermediate layer. The intermediate layer utilizes a polyurethane binder. However, Permax 202 is used rather than Sancure 2710. Permax 202 softens at a lower temperature than Sancure 2710 resulting in better penetration into the substrate (t-shirt). At the same time, Permax 202 exhibits greater stretch than Sancure 2710. A cross-linked colored layer is incorporated to maintain greater opacity when applied to dark colored fabrics at high temperatures.

Design 6 utilizes no cross-linked color layer. Instead all color is developed by using a colored intermediate layer. Permax 202 is the preferred binder for this embodiment due to its high stretch and ability to soften and bond to substrates, especially at elevated temperatures. For both Designs 5 & 6 a top layer is used but it is optional. A top layer can serve to help prevent roll blockage. And at the same time it aids in bonding to substrates. If application temperatures are expected to be low then a thicker top layer is preferred. In such low temperature cases the top layer will be performing the majority of the bonding.

While the invention has been described in detail with respect to the specific embodiments thereof, it will be appreciated that those skilled in the art, upon attaining an understanding of the foregoing, may readily conceive of alterations to, variations of, and equivalents to these embodiments. Accordingly, the scope of the present invention should be assessed as that of the appended claims and any equivalents thereto.

What is claimed:

1. A method of transferring an image to a substrate, the method comprising cutting partially into a heat transfer material to define a shape with cuts made into the heat transfer material, wherein the heat transfer material comprises a transferable portion directly overlying a release layer that is directly on a base sheet, wherein the cuts are made into the heat transfer material through the transferable portion while leaving the release layer and base sheet uncut, wherein the transferable portion comprises a top layer on a color layer on a tie layer, wherein the tie layer overlies the release layer, and wherein the top layer is exposed on the heat transfer material;

removing the transferable portion of the heat transfer material from the base sheet in an area surrounding the shape;

positioning the heat transfer material adjacent the substrate such that the transferable portion defined by the shape contacts the substrate;

applying heat and pressure to the base sheet over the heat transfer material defined by the shape at a transfer temperature such that the transferable portion defined by the shape of the heat transfer material is transferred to the substrate, wherein the color layer is cross-linked so as to not appreciably melt and flow at the transfer temperature; and thereafter, removing the base sheet leaving the tie layer exposed and overlying the color layer on the substrate.

2. The method as in claim 1, wherein removing the transferable portion of the heat transfer material from the base sheet in an area surrounding the shape requires a peel force of about 10 grams to about 100 grams.

3. The method as in claim 2, wherein the peel force is about 25 grams to about 50 grams.

4. The method as in claim 1, wherein the top layer is configured to melt and flow at the transfer temperature such that the top layer bonds to the substrate.

5. The method as in claim 4, wherein the top layer comprises film-forming binder and a powdered thermoplastic polymer.

6. The method as in claim 1, wherein the color layer comprises a polymeric binder, a powdered thermoplastic polymer, and a coloring agent.

7. The method as in claim 6, wherein the polymeric binder comprises an acrylic binder.

8. The method as in claim 6, wherein the powdered thermoplastic polymer comprises a powdered polyethylene wax having an average particle size of about 1 microns to about 20 microns.

9. The method as in claim 6, wherein the polymeric binder and the powdered thermoplastic polymer are present in the color layer in a ratio of about 2:1 to about 20:1 by weight percent based on the dry weight of the color layer, respectively.

10. The method as in claim 6, wherein the color layer further comprises an acrylic latex material.

11. The method as in claim 10, wherein the color layer further comprises an epoxy resin and an epoxy curing agent.

12. The method as in claim 11, wherein the epoxy curing agent comprises 2-methyl imidazole.

13. The method as in claim 1, wherein the transferable portion further comprises an intermediate layer positioned between the top layer and the color layer.

14. The method as in claim 13, wherein the intermediate layer comprises a film-forming material configured to melt and flow at the transfer temperature.

15. The method as in claim 14, wherein the film-forming material comprises a polyurethane.

16. The method as in claim 1, wherein the tie layer is configured to melt and flow at the transfer temperature.

17. The method as in claim 16, wherein the tie layer comprises a film-forming binder and a powdered thermoplastic polymer.

18. The method as in claim 1, wherein the top layer and the tie layer have a substantially identical composition including a film-forming binder and a powdered thermoplastic polymer, 19. A method of transferring an image to a substrate, the method comprising cutting partially into a heat transfer material to define a shape with cuts made into the heat transfer material, wherein the heat transfer material comprises a transferable portion overlying a release layer overlying a base sheet, wherein the cuts are made into the heat transfer material through the transferable portion while leaving the release layer and base sheet uncut, wherein the transferable portion comprises a top layer on a color layer on a tie layer, wherein the tie layer overlies the release layer, and wherein the top layer is exposed on the heat transfer material;

removing only the transferable portion of the heat transfer material from the base sheet in an area surrounding the shape while leaving the release layer and base sheet to form a transitional heat transfer sheet;

positioning the transitional heat transfer sheet adjacent the substrate such that the transferable portion defined by the shape contacts the substrate;

applying heat and pressure to the base sheet over the transitional heat transfer sheet at a transfer temperature such that the transferable portion defined by the shape of the transitional heat transfer sheet is transferred to the substrate, wherein the color layer is cross-linked so as to not appreciably melt and flow at the transfer temperature; and thereafter, removing the base sheet leaving the tie layer exposed and overlying the color layer on the substrate.

20. The method of claim 1, wherein the base sheet is removed via a hot peel process such that the tie layer splits with a first portion of the tie layer remaining on the base sheet while a second portion of the tie layer is transferred to the substrate along with the transferable portion.

21. The method of claim 1, wherein the base sheet is removed via a cold peel process, wherein the tie layer releases from the base sheet such that substantially all of the tie layer is transferred to the substrate.

* * * * *